Figure 1:
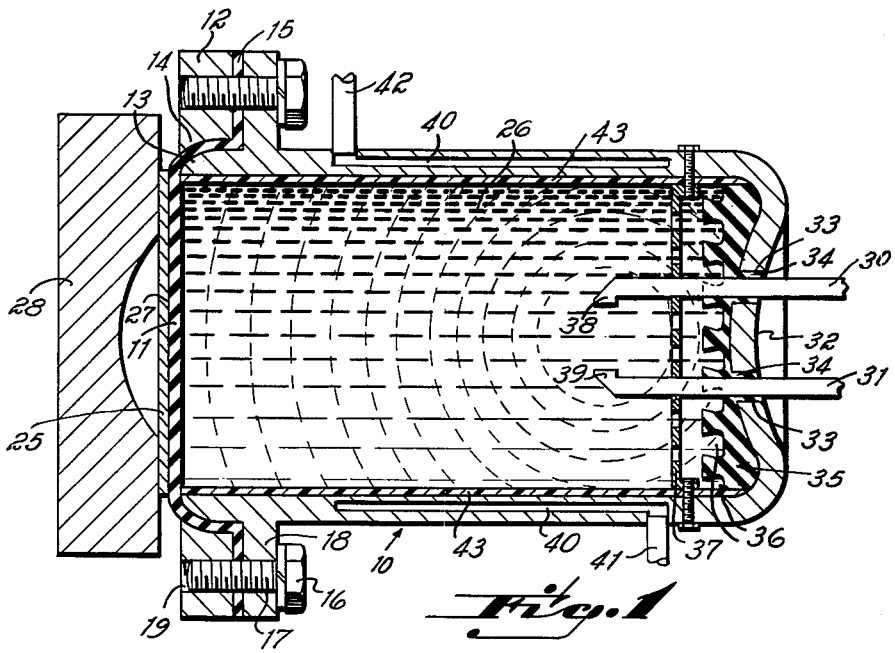

Dec. 28, 1965  E. C. KRIEGER  3,225,578
METHOD AND APPARATUS FOR UTILIZING ELECTRICAL
DISCHARGE PRESSURE WAVES
Filed Dec. 12, 1962  2 Sheets-Sheet 1

INVENTOR.
Erwin C. Krieger
BY
Wood, Herron & Evans
ATTORNEYS

INVENTOR.
Erwin C. Krieger
BY
Wood, Herron & Evans
ATTORNEYS

United States Patent Office 3,225,578
Patented Dec. 28, 1965

3,225,578
METHOD AND APPARATUS FOR UTILIZING ELECTRICAL DISCHARGE PRESSURE WAVES
Erwin C. Krieger, 2321 Rohs St., Cincinnati 19, Ohio
Filed Dec. 12, 1962, Ser. No. 244,088
16 Claims. (Cl. 72—56)

This invention relates to apparatus for utilizing spark discharge created pressure waves and more particularly to an improved apparatus for using such pressure waves to form or stamp sheet metal.

Presently underwater electrical discharge metal forming is a known, though commercially limited, metal-forming technique. This process depends upon the sudden release of stored electrical energy to generate the force necessary to shape metal into a desired form. High energy current pulses are produced when the external circuit of a storage capacitor bank is completed. These current pulses are passed through a system of electrodes immersed in a fluid medium with either fine wire or, usually, a gap of predetermined length between each pair of electrodes. The surge of energy creates a rapidly expanding arc channel through the liquid between the electrodes. The inertia of the fluid resists the expansion of the arc, causing the pressure in the channel to rise to many thousand atmospheres. This pressure wave is transmitted through the fluid and engages a submerged workpiece to force the workpiece into a female die pocket. The pocket is usually evacuated because the process is otherwise inhibited by the cushioning effect of any entrapped air or liquid.

Electrical discharge forming has numerous inherent advantages such as low die cost because of the necessity of no more than one female die, the elimination of expensive and massive presses and the finite control over the shape and size of the pressure pulse by controlling the total energy, voltage and the inductance, capacitance and resistance constants of the circuit by which the electrical discharge is created. However, the process as presently practiced is subject to the severe criticism and limitation that the workpiece must be submerged in water or another fluid medium. This has meant that the die must be lifted from the fluid medium, the workpiece clamped in the die, and the die and workpiece submerged in the fluid for each cycle or repetition of the forming operation. Obviously this is a time consuming and expensive practice.

It has been an objective of this invention to provide apparatus and an improved method of electrical discharge metal-forming enabling the process to be carried on without submerging the workpiece into a fluid medium. To this end, this invention incorporates a fluid-tight or impervious pressure-wave transmitting medium between the fluid and the workpiece, which transmits the spark-discharge formed pressure-wave to the workpiece with a minimum of reflection and consequent loss of energy. By utilizing an impervious pressure-wave transmitting membrane between the fluid and the workpiece, it is possible to form the workpiece without submerging it in the fluid. However, the membrane must have a pressure-wave impedance which closely matches that of the fluid, if it is to be smoothly transmitted through the membrane without reflection. Reflection dissipates or attenuates the energy of the wave and thus results in inefficient utilization of the energy of the electrically created spark-discharge wave. That is to say, if the membrane has a resistance to the passage of the pressure wave equal to that of the fluid, the pressure wave will pass completely from the fluid through the membrane to the workpiece. However, if the resistance differs from that of the fluid, a portion of the pressure wave will be reflected back to its source.

Electrical discharge pressure-wave impedance is defined as thep roduct of the density of the material times the velocity of transmission of the wave in the material. I have discovered that an electrical discharge pressure-wave exhibits the same physical phenomenon and behaves in much the same manner as an acoustical pressure-wave. By way of analogy, an acoustical pressure-wave is in reality a low-energy pressure wave and has an impedance in a given material which is defined as the product of the density of the material times the velocity of sound in the material. By matching the electrical discharge pressure-wave impedance of the impervious membrane to that of the fluid within which the pressure wave is created, a smooth flow of the wave from the fluid to the membrane may be achieved without a consequent loss of energy during transmission from the fluid to the workpiece blank.

Still another objective of this invention has been to provide an improved method and apparatus to control the conformation of the wave transmitted to the workpiece blank. I have found that the speed of propagation of the wave varies between the fluid and the impervious membrane and it is therefore possible to control the shape of the wave emitted from the apparatus by means of the contour and thickness of the membrane. Thus, if the pressure-wave travels at a faster rate within the membrane than in the fluid, the membrane may be shaped as a concave lens so as to change a generally convex wave-form into a flat wave at the time it passes from the membrane. Similarly, other conformations of the emitted wave may be achieved by utilizing appropriately shaped membranes in the apparatus.

By control of the wave conformation or contour at the time it is emitted from the membrane it is possible to shape a workpiece blank without the use of any dies. Thus, if a flat sheet of resilient material is utilized as a backing member rather than a die, a contour will be imparted to the workpiece which generally corresponds to the wave form at the time it emerges from the apparatus and engages the workpiece. Thus the workpiece may be given a spheroid conformation without using a female die if a spherical wave form is emitted from the apparatus and imparted to the workpiece or, by providing a suitably shaped membrane, a dimpled effect may be imparted. Similarly any desired conformation of the workpiece may be achieved without using any die by merely focusing the wave through an appropriately contoured membrane between the fluid and the workpiece.

Still another objective of this invention has been to provide apparatus for the rapid repeating of forming operations. Since the apparatus of this invention enables the process to be carried on without submerging the workpiece, the only limitations in the speed of operation of the device are the speeds at which the workpiece can be fed into the material, the capacitor bank charged, and the pressure-wave attenuated. So long as a previous pressure-wave is resonating within the fluid chamber another cycle cannot be initiated. This attenuation of the pressure-wave is necessitated because there must be intimate contact between the workpiece blank and the membrane for efficient operation of the system. Any air pockets between the two materials causes partial reflection of the pressure-wave and loss of energy. If a pressure-wave has not been completely dissipated from a previous cycle before the next cycle is initiated, the resonating pressure-wave forces the workpiece away from the membrane and thus creates an undesirable air-pocket between the workpiece and the membrane. Additionally, the interaction or interference of a resonating pressure-wave with a subsequent pressure-wave tends to cancel or decrease the energy of the subsequent wave. However, by providing means within the apparatus to quickly attenuate the pressure-wave, the tendency for a reflected portion of the wave to drive the workpiece away from intimate contact with the membrane or to decrease the energy of a subsequent wave is obviated.

Still another advantage which accrues from the incorporation of pressure-wave attenuating means within the apparatus is the consequent reduction in weight and strength required to be imparted to the fluid chamber. A spark-gap created electrical discharge wave is generally spherical in shape. Assuming that a workpice is to be formed into a shape other than a sphere, all of the pressure wave is not utilized to form the workpiece. Therefore, that portion of the wave which is directed away from the workpiece should be quickly dissipated in possible before striking the chamber wall. By providing a pressure-wave attenuating mechanism between this unused portion of the pressure-wave and the fluid chamber it is possible to substantially reduce the thickness and rigidity required in that portion of the fluid chamber.

Still another objective of this invention has been to provide mechanism within the apparatus for controlling its operating characteristics by controlling the temperature of the fluid and membrane. Since the pressure-wave impedance of a material varies with changes in temperature, and impedance variations of materials are not directly proportional upon changes in temperature, the impedance of the membrane and the fluid may be more accurately matched and the match maintained by controlling the temperature of the fluid and the mebrane. Generally the impedance of the membrane decreases upon an increase in temperature while the impedance of the fluid increases with an increase in temperature. Therefore, to maintain the balance of impedances of the two mediums the temperature should be maintained at a preselected level. In addition, temperature control of the medium enables the pressure-wave impedance of the materials to be "tuned" or matched by varying the temperature so that a slight mismatch of impedance may be corrected by changing the temperature of the fluid and membrane.

Figures 2, 3, 4:
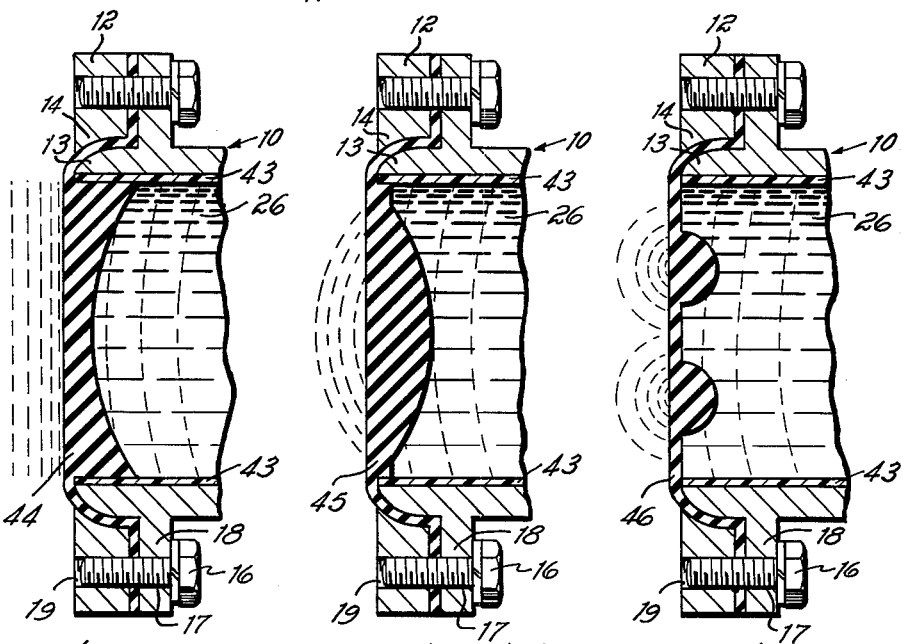
Figure 5:
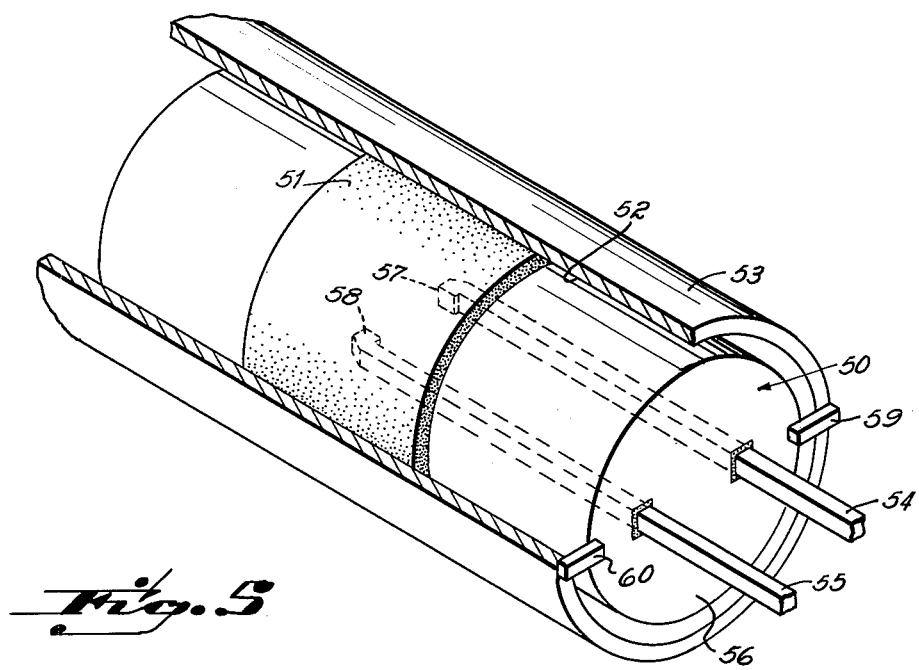

These and other objectives and advantages of the invention will be more readily apparent from a description of preferred embodiments of the invention taken in conjunction with the description of the drawings in which:

FIGURE 1 is a diagrammatic cross sectional view of a preferred embodiment of the invention, FIGURE 2 is a cross sectional view of a portion of the apparatus of FIGURE 1 incorporating a modified form of the impervious membrane, FIGURE 3 is a cross sectional view of a poriton of the apparatus of FIGURE 1 incorporating still another modified form of the impervious membrane, FIGURE 4 is a cross sectional view of a portion of the apparatus of FIGURE 1 incorporating yet another form of the impervious membrane, FIGURE 5 is a perspective view, partially broken away, of another modification of the invention.

As shown in FIGURE 1, the apparatus of this invention comprises a cyclindrical fluid chamber 10 open at its forward end and closed at the rear. The forward end is covered by a fluid-impervious membrane 11 secured to the chamber 10 by means of a sealing ring 12. The chamber 10 has a forward shoulder 13 which is rounded or curved and the inner surface of the sealing ring 12 is provided with a similarly curved surface 14 adapted to mate with the rounded shoulder 13 so as to firmly secure the peripheral flange portion 15 of the membrane 11 therebetween in a fluid tight seal. The sealing ring 12 is secured to the chamber by means of a plurality of bolts 16 which extend through apertures 17 of a flange 18 on the forward end of the chamber and into threaded apertures 19 of the sealing ring.

In order for the apparatus of this invention to operate efficiently, intimate contact must be established between the fluid-impervious membrane 11 and the surface of the workpiece 25. Since the shock-wave impedance of air does not match that of the fluid 26 within the chamber 10 or the impedance of the membrane 11, any air pockets between the workpiece and the membrane lessens the efficiency of the apparatus because of the reflection of the shock-wave which takes place at the interface of the air and the membrane. Therefore the forwardmost surface 27 of the membrane 11 is located in a plane spaced forwardly from the forwardmost surface of the chamber 10 and the sealing ring 12. In this way intimate contact of the membrane 11 with the workpiece 25 is assured and there is no tendency for the outer surface of the chamber or sealing ring to abut against the workpiece or a die 28 and impair good surface contact between the membrane and the workpiece.

The fluid-impervious membrane 11 may be made from any one of a number of materials so long as the electrical discharge shock-wave impedance of the material matches that of the fluid 26 contained within the chamber 10. By way of example, one membrane material and fluid which have the requisite matched impedances are natural gum rubber and a saline solution of 15% sodium chloride in water. Since the product of the densities of these materials and the speeds of propagation of pressure waves therein are closely matched, the electrical discharge pressure-wave impedance of these materials is such that a pressure-wave will be transmitted from the fluid through the membrane with a minimum of reflection. Both of these materials have a spark-gap generated pressure-wave velocity of approximately 6061 meters per second at room temperature. Natural gum rubber has a density of 1.10 g./cc. and a 15% solution of sodium chloride in water has a density of 1.11 g./cc. Therefore the electrical discharge generated pressure-wave impedance of the natural gum rubber is equal to $6.94 \times 10^5$ g./cc.$^2$/sec. while the 15% saline solution has an impedance of $6.97 \times 10^5$. Since the pressure-wave impedances of these materials are so closely matched, this combination is useful in the apparatus of this invention to transmit the electrical discharge generated pressure wave to the workpiece without reflection.

Still another example of two materials which are closely matched in impedance at room temperature are glycol which has an electrical discharge pressure wave impedance of $6.79 \times 10^5$ g./cc.$^2$/sec. and natural black rubber which has an electrical discharge pressure-wave impedance of $6.67 \times 10^5$ g./cc.$^2$/sec. Natural black rubber is a slightly denser material than natural gum rubber and is composed of natural gum rubber to which is added carbon black. The carbon black is not an inert filler but enhances and reinforces various properties of rubber such as importing added strength and rigidity to the natural gum rubber. Numerous other fluids and fluid-impervious materials may be utilized in combinations which have matching electrical discharge pressure-wave impedances.

At the rear of the fluid chamber, a pair of electrodes 30, 31 extend through apertures 33 in the rear wall 32. The electrodes are insulated from the chamber wall by means of extensions 34 of a pressure-wave attenuating device 35 mounted inside the chamber and against the rear wall. The pressure wave attenuating device 35 consists of a molded rubber member having a plurality of grooves 36 therein which are dove tailed when viewed in cross section. The grooves assist in dissipating the pressure wave by disassociation of the wave into a plurality of sections resonated and dissipated within the chambers formed by the grooves. To assist in breaking up or disassociating the pressure wave, a perforated plate 37 extends transversely across the fluid chamber at a point located between the ends 38, 39 of the electrodes and the molded attenuating member 35.

One of the factors which determines the ultimate speed of operation or of repetition of the device is the speed with which a pressure wave is dissipated. So long as a wave is resonating within the fluid chamber 10, the membrane 11 cannot be placed and held in intimate contact with a new workpiece and the cycle repeated since the resonating pressure wave forces the workpiece away from the membrane and by so doing establishes an air pocket between the workpiece and the membrane before initiation of the next cycle. Such a pocket lowers the efficiency of the apparatus because of the reflection of the pressure wave which occurs when the wave is transmitted from the membrane to the air. This reflection phenomenon is very similar to that which occurs when sound is transmitted from water to air in that there is a high percentage of reflection of the pressure wave at the surface of the water. By using pressure-wave attenuating apparatus in the rear of the fluid chamber, reflection or resonation of the wave within the chamber is avoided and the rate of operation of the apparatus may be correspondingly increased.

To cool the fluid chamber and maintain the fluid and membrane at a preselected temperature, an annular cooling chamber or water jacket 40 is provided around the periphery of the chamber. Cooling fluid is inserted into the cooling chamber 40 through a fluid inlet conduit 41 at one side of the chamber and passes out of the chamber through an outlet conduit 42 located at the opposite side of the chamber. By controlling the fluid flow through the cooling chamber, an even temperature may be maintained within the fluid 26 and membrane 11. Additionally by controlling the temperature of the fluid 26 and membrane 11, the pressure-wave impedance of the membrane 11 and fluid 26 may be "tuned" or matched. This is possible because the velocity of a pressure wave within the natural rubber membrane material generally decreases with an increase in temperature while the velocity within most fluids increases with an increase in temperature. For example, the velocity of a sound wave in natural rubber at 5° C. is 1,578 meters per second and at 50° C. is 1,427 meters per second. The velocity of a sound pressure wave in salt water is 1,510 meters per second at 5° C. and 1,602 meters per second at 50° C. Therefore by varying the temperature of the fluid and membrane, the impedances may be closely matched or "tuned."

In order to protect the fluid chamber 10 against the corrosive effect of the fluid within the chamber, the inner wall of the chamber is lined with a sleeve 43. The material of the liner will be dependent upon the composition of the fluid 26. One generally suitable material is "Teflon" which is non-corrosive in a saline environment.

Pressure-waves eminating from a single spark-gap source radiate generally in the form of a sphere. The spherical wave-form may or may not be desirable depending upon the application for which it is being used. For example, if a workpiece is to be formed into the shape of a spheroid, as shown in FIGURE 1, a spherical wave-form is desirable. However, in other applications a different wave conformation may be desired. Since the velocity of the wave-form varies between the fluid and membrane depending upon the membrane and fluid selected, it is possible to alter the wave-shape eminating from the membrane. This may be accomplished by varying the cross sectional thickness of the membrane as shown in FIGURES 2, 3 and 4. Assuming that a membrane material is selected which transmits the wave-form at a higher velocity than it is transmitted within the fluid, by making the inner surface of the membrane 44 concave as shown in FIGURE 2, a convex wave-form may be made flat at the time it leaves the membrane. This is possible because the lateral edge of the wave travels at a faster rate through the membrane than the center portion does in the fluid so that the edges of the wave "catch up with" the center section traveling in the fluid. Similarly, other wave-forms may be accomplished by varying the thickness of the membrane 45, 46 at varying portions thereof as shown in FIGURES 3 and 4.

By using appropriately shaped wave-forms it is possible to eliminate the necessity for a female die member. A workpiece supported by a resilient member will be generally contoured into the shape of the wave-form striking it. Thus a flat sheet of rubber may be used in place of a contoured die to achieve a contoured workpiece, assuming an appropriately contoured membrane is utilized in the apparatus.

The modification of FIGURE 5 differs from that illustrated in FIGURE 1 only in that both ends of the chamber 50 are enclosed and the fluid-impervious membrane 51 is in the form of an annular band extending around the periphery of the cylindrically shaped chamber. The membrane 51 is of greater thickness than the chamber walls so that its peripheral surface extends beyond the peripheral surface of the chamber. Thus good surface contact may be established between the surface of the membrane 51 and the interior surface 52 of a tubular shaped workpiece 53 while still permitting it to be easily placed over the membrane. In this embodiment the electrodes 54, 55 extend through the one end wall 56 of the chamber and are insulated therefrom in the same manner illustrated in the embodiment shown in FIGURE 1. The electrodes are located centrally of the width of the membrane so that upon discharge of a spark across the ends 57, 58 of the electrodes, the spherically shaped pressure-wave will pass through the fluid and membrane and force the tubular workpiece to bulge outwardly.

To locate the workpiece in an axial position over the fluid containing chamber 50, a pair of stop abutments 59, 60 extend radially outwardly from the chamber and are welded or otherwise secured thereto. Thus the bulge placed in the workpiece by the electrical discharge pressure wave will be accurately and identically located in each workpiece.

Having described my invention, I claim:

1. A method of forming material into objects having the conformation of a die which comprises, placing the material over a die, creating an electrical discharge pressure wave in a fluid medium, transmitting the electrical discharge pressure wave through the fluid medium and a fluid impervious pressure wave transmitting member having approximately the same spark discharge pressure wave impedance as said fluid medium whereby said electrical discharge pressure wave passes directly through said impervious pressure wave transmitting member, and engaging the material with the electrical discharge pressure wave to force the material into the die.

2. A method of forming material into objects having the conformation of a die which comprises, placing the material over a die, creating a spark discharge pressure wave in a fluid medium, transmitting the spark discharge pressure wave through the fluid medium and a fluid impervious pressure wave transmitting member having approximately the same spark discharge pressure wave impedance as said fluid medium whereby said spark discharge pressure wave passes directly through said impervious pressure wave transmitting member, and engaging the material with the spark discharge pressure wave to force the material into the die.

3. A method of bulging a tubular workpiece which comprises, placing the workpiece over a fluid containing chamber, creating a spark discharge pressure wave in a fluid medium within the chamber, transmitting the spark discharge pressure wave through the fluid medium and a fluid impervious pressure wave transmitting member having approximately the same spark discharge pressure wave impedance as said fluid medium whereby said spark discharge pressure wave passes directly through said impervious pressure wave transmitting member, and engaging the material with the spark discharge pressure wave to bulge the workpiece outwardly.

4. Spark discharge apparatus comprising,
a fluid containing chamber,
a pair of electrodes extending into said chamber and immersed in said fluid,
a fluid impervious pressure wave transmitting member extending over at least a portion of said chamber and adapted to be placed in engagement with a material to be acted upon by said apparatus,
said impervious pressure wave transmitting member having a spark discharge pressure wave impedance which approximately matches that of the fluid contained within said chamber whereby a spark discharge pressure wave is transmitted through said fluid and said member with a minimum of reflection and loss of energy.

5. Electrical discharge apparatus comprising,
a fluid containing chamber,
means extending into said chamber and immersed in said fluid for creating an electrical discharge pressure wave,
a fluid impervious pressure wave transmitting membrane extending over an open portion of said chamber and adapted to be placed in engagement with a member into which the pressure wave is to be transferred,
said impervious pressure wave transmitting member having an electrical discharge pressure wave impedance which approximately matches that of the fluid contained within said chamber whereby an electrical discharge pressure wave is transmitted through said fluid and said membrane with a minimum of reflection and loss of energy.

6. Electrical discharge apparatus comprising,
a fluid containing chamber,
means extending into said chamber and immersed in said fluid for creating an electrical discharge pressure wave,
a rubber pressure wave transmitting member extending over an open portion of said chamber and adapted to be placed in engagement with a material to be acted upon by said apparatus,
said member having an electrical discharge pressure wave impedance which approximately matches that of the fluid contained within said chamber whereby an electrical discharge pressure wave is transmitted through said fluid and said member with a minimum of reflection and loss of energy.

7. Electrical discharge apparatus comprising,
a fluid containing chamber,
means extending into said chamber and immersed in said fluid for creating an electrical discharge pressure wave,
a rubber pressure wave transmitting member of varying cross sectional thickness extending over an open portion of said chamber and adapted to be placed in engagement with a material to be acted upon by said apparatus,
said member having an electrical discharge pressure wave impedance which approximately matches that of the fluid contained within said chamber whereby an electrical discharge pressure wave is transmitted through said fluid and said member with a minimum of reflection and loss of energy.

8. Electrical discharge apparatus comprising,
a fluid containing chamber,
means extending into said chamber and immersed in said fluid for creating an electrical discharge pressure wave,
a fluid impervious pressure wave transmitting member extending over an open portion of said chamber and adapted to be placed in engagement with a material to be acted upon by said apparatus,
said impervious pressure wave transmitting member having an electrical discharge pressure wave impedance which approximately matches that of the fluid contained within said chamber whereby an electrical discharge pressure wave is transmitted through said fluid and said member with a minimum of reflection and loss of energy, and
means mounted within said chamber for quickly attenuating unused portions of pressure waves created within said chamber.

9. Spark discharge material forming apparatus for forming material into the conformation of a die comprising,
a fluid containing chamber,
a pair of electrodes extending into said chamber and immersed in said fluid,
a rubber pressure wave transmitting membrane extending over at least a portion of said chamber and adapted to be placed in engagement with the material to be forced into the die,
said membrane having a spark discharge pressure wave impedance which approximately matches that of the fluid contained within said chamber whereby a spark discharge pressure wave is transmitted through said fluid and said membrane with a minimum of reflection and loss of energy, and
means to control the temperature of the fluid contained within the chamber.

10. Electrical discharge apparatus comprising,
a fluid containing chamber,
means extending into said chamber and immersed in said fluid for creating an electrical discharge pressure wave,
a fluid impervious pressure wave transmitting member extending over an open portion of said chamber and adapted to be place in engagement with a material to be acted upon by said apparatus,
said impervious pressure wave transmitting member having an electrical discharge pressure wave impedance which approximately matches that of the fluid contained within said chamber whereby an electrical discharge pressure wave is transmitted through said fluid and said member with a minimum of reflection and loss of energy, and
means to control the temperature of the fluid contained within said chamber.

11. Electrical discharge apparatus comprising,
a fluid containing chamber,
means extending into said chamber and immersed in said fluid for creating an electrical discharge pressure wave,
a rubber pressure wave transmitting membrane extending over an open portion of said chamber and adapted to be placed in engagement with a material to be acted upon by said apparatus,
said membrane having a density approximately equal to that of the fluid contained within said chamber, and
means to control the temperature of the fluid within the chamber.

12. Spark discharge apparatus for bulging a tubular workpiece comprising,
a fluid containing tubular chamber,
a pair of electrodes extending into said chamber and immersed in said fluid,
a fluid impervious pressure wave transmitting membrane extending around the periphery of said chamber and adapted to be placed in engagement with the tubular workpiece,
said membrane having a spark discharge pressure wave impedance which approximately matches that of the fluid contained within said chamber whereby a spark discharge pressure wave is transmitted through said fluid and said membrane with a minimum of reflection and loss of energy and into engagement with said tubular workpiece to bulge the workpiece outwardly in the area engaged by said membrane.

13. Electrical discharge material forming apparatus for forming material into the conformation of a die comprising,
   a fluid containing chamber,
   means extending into said chamber and immersed in said fluid for creating an electrical discharge pressure wave,
   a rubber pressure wave transmitting member extending over an open portion of said chamber and adapted to be placed in engagement with a material to be acted upon by said apparatus,
   said impervious pressure wave transmitting member having an electrical discharge pressure wave impedance which approximately matches that of the fluid contained within said chamber whereby an electrical discharge pressure wave is transmitted through said fluid and said member with a minimum of reflection and loss of energy,
   means to control the temperature of the fluid contained within said chamber, and
   means mounted within said chamber for quickly attenuating unused portions of pressure waves created within said chamber.

14. Spark discharge apparatus comprising:
   a fluid containing chamber,
   means for creating an electrical discharge pressure wave within the fluid in said chamber,
   a membrane of resilient material extending over an an open portion of said chamber and adapted to be placed in engagement with a member into which a pressure wave is to be transferred,
   and means for varying the conformation of said pressure wave as it passes through said membrane, said last named means comprising a varying cross-sectional thickness of said membrane whereby pressure waves created within said fluid by said pressure wave creating means are focused and modified in contour.

15. Electrical discharge apparatus comprising:
   a fluid containing chamber,
   means for creating an electrical discharge pressure wave within the fluid in said chamber,
   a membrane of resilient material extending over one end wall of said chamber and adapted to be placed in engagement with a member into which a pressure wave is to be transferred, and,
   grooved resilient means mounted within said chamber for quickly attenuating portions of pressure waves which are directed away from said membrane.

16. The metal forming apparatus of claim 15 wherein said grooves are generally dovetailed in cross sectional contour.

References Cited by the Examiner
UNITED STATES PATENTS

| | | | |
|---|---|---|---|
| 1,766,700 | 6/1930 | Anderson | 113—44 |
| 2,385,083 | 9/1945 | Kemerer | 113—44 |
| 2,559,227 | 7/1951 | Rieber | 340—12 |
| 3,036,374 | 5/1962 | Williams | 113—44 |
| 3,068,822 | 12/1962 | Orr et al. | 113—44 |

FOREIGN PATENTS 1,265,540   5/1961   France.

OTHER REFERENCES

"Explosives Form Space Age Shapes"; Steel, August 25, 1958, pages 83–86.

"Hydrospark Forming," by Parr; The Tool Engineer, March 1960, pages 81–86.

CHARLES W. LANHAM, *Primary Examiner.*

WILLIAM J. STEPHENSON, *Examiner.*